United States Patent
Han et al.

(10) Patent No.: US 8,699,816 B2
(45) Date of Patent: Apr. 15, 2014

(54) METHOD AND APPARATUS FOR ENHANCING DETAIL BASED ON NOISE ELIMINATION, AND METHOD AND APPARATUS FOR CALCULATING NOISE WEIGHT

(75) Inventors: Young Ran Han, Gyeonggi-do (KR); Du-Sik Park, Gyeonggi-do (KR); Seung Sin Lee, Gyeonggi-do (KR); Kwon Ju Yi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1063 days.

(21) Appl. No.: 12/047,541

(22) Filed: Mar. 13, 2008

(65) Prior Publication Data

US 2009/0087121 A1    Apr. 2, 2009

(30) Foreign Application Priority Data

Oct. 1, 2007   (KR) .................. 10-2007-0098958

(51) Int. Cl.
*G06T 5/00*    (2006.01)
*G06K 9/40*    (2006.01)
*H04N 5/14*    (2006.01)
*H04N 9/64*    (2006.01)
*H04N 5/00*    (2011.01)
*H04N 9/78*    (2006.01)

(52) U.S. Cl.
USPC .......... 382/275; 382/260; 382/264; 382/266; 348/571; 348/607; 348/619; 348/622; 348/664; 348/668

(58) Field of Classification Search
USPC .......... 382/260, 264, 266, 275; 348/571, 607, 348/619, 622, 664, 668
See application file for complete search history.

(56) References Cited

U.S. PATENT DOCUMENTS 5,513,280 A * 4/1996 Kawamura .................. 382/266
5,539,541 A * 7/1996 Ushida ......................... 358/530

(Continued)

FOREIGN PATENT DOCUMENTS

JP   2001-005960   1/2000
JP   2001-285641   10/2001

(Continued)

OTHER PUBLICATIONS

Garnett et al., "A Universal Noise Removal Algorithm With an Impulse Detector", IEEE Transactions on Image Processing, vol. 14 No. 11, Nov. 2005, pp. 1747-1754.*
Korean Office Action issued Apr. 26, 2013 in corresponding Korean Patent Application No. 10-2007-0098958.

*Primary Examiner* — Matthew Bella
*Assistant Examiner* — Jose M Torres
(74) *Attorney, Agent, or Firm* — Staas & Halsey LLP

(57) ABSTRACT

A method to enhance detail of an image based on noise elimination includes calculating a noise weight corresponding to a probability that a center pixel, located in a block of pixels of a region of the image, is noise by using a difference between the center pixel and a surrounding pixel located in the block of pixels, calculating a first substitution value for the center pixel based on the noise weight; and calculating a second substitution value for the center pixel by using the noise weight and a sharpen filter.

26 Claims, 7 Drawing Sheets

(56) References Cited

U.S. PATENT DOCUMENTS

| | | | |
|---|---|---|---|
| 5,880,767 A * | 3/1999 | Liu | 347/251 |
| 6,347,161 B1 * | 2/2002 | Mancuso | 382/261 |
| 7,062,108 B2 * | 6/2006 | Gallagher et al. | 382/302 |
| 7,319,797 B2 * | 1/2008 | Hung | 382/260 |
| 7,346,226 B2 * | 3/2008 | Shyshkin | 382/275 |
| 7,394,856 B2 * | 7/2008 | Bhaskaran | 375/240.29 |
| 7,548,660 B2 * | 6/2009 | Chiu | 382/266 |
| 7,697,782 B2 * | 4/2010 | Pan | 382/275 |
| 2006/0039624 A1 * | 2/2006 | Kong et al. | 382/274 |
| 2007/0177816 A1 * | 8/2007 | Yoo et al. | 382/264 |

FOREIGN PATENT DOCUMENTS

| | | |
|---|---|---|
| JP | 2005-354701 | 12/2005 |
| KR | 2006-98952 | 9/2006 |
| KR | 2006-109265 | 10/2006 |
| KR | 10-2007-0078463 | 8/2007 |

* cited by examiner

METHOD AND APPARATUS FOR ENHANCING DETAIL BASED ON NOISE ELIMINATION, AND METHOD AND APPARATUS FOR CALCULATING NOISE WEIGHT

CROSS-REFERENCE TO RELATED APPLICATION

This application claims the benefit of Korean Application No. 2007-98958, filed Oct. 1, 2007, in the Korean Intellectual Property Office, the disclosure of which is incorporated herein by reference.

BACKGROUND OF THE INVENTION

1. Field of the Invention

Aspects of the present invention relate to a method and apparatus to enhance detail of an image, which can eliminate a noise signal of the image by processing an image signal and improve a resolution of the image signal by enhancing detail of an edge.

2. Description of the Related Art

A conventional method to enhance detail of an image is a method of extracting a high-frequency element from an image signal, amplifying the high-frequency element by a predetermined amount, and subsequently adding the predetermined amount to an original signal. The conventional art has also developed a method of preventing an amplification of a noise signal which has a low amplitude included in an input signal, and a method of increasing an amplitude of a normal signal.

However, in the conventional art, the amplification of the normal signal is restricted in order to prevent the amplification of the noise signal, and detail improvement is limited. Also, a noise of the original signal cannot be eliminated even though the amplification of the noise signal is completely prevented. Accordingly, a separate noise elimination apparatus is required to be used.

When the separate noise elimination apparatus is used, two methods are used with the separate noise elimination apparatus to improve detail. One method is a method of sequentially installing an execution apparatus and enhancing a signal eliminating noise by using a method of enhancing detail. Another method is a method of respectively and independently eliminating noise and enhancing the detail of the image, thereby multiplying a result of noise elimination and detail enhancement.

SUMMARY OF THE INVENTION

Aspects of the present invention provide a method and apparatus to enhance detail which can calculate a noise weight denoting a degree of noise of a pixel, and perform, in parallel, noise elimination for a noise area based on the noise weight and detail enhancement for an area other than the noise area.

Aspects of the present invention also provide a method and apparatus to enhance a detail which can select any one of two results of noise elimination and detail enhancement for an inputted pixel based on a sum of noise weights, and determine the selected result as an output value.

Aspects of the present invention also provide a method and apparatus to calculate a noise weight by using a pixel value difference between two pixels.

According to an aspect of the present invention a method of enhancing detail of an image includes calculating a noise weight corresponding to a probability that a center pixel, located in a block of pixels in a region of the image, is noise by using a pixel value difference between the center pixel and a surrounding pixel located in the block of pixels, calculating a first substitution value for the center pixel based on the noise weight, and calculating a second substitution value for the center pixel by using the noise weight and a sharpen filter.

In an aspect of the present invention, the surrounding pixel includes a remaining pixel other than the center pixel selected from among pixels included in the block of pixels comprising an n×n-sized block of pixels centered on the center pixel.

In an aspect of the present invention, the calculating of the noise weight includes: calculating the pixel value difference among each surrounding pixel and the center pixel, and calculating the noise weight based on the pixel value difference and a noise level. Here, the noise level is a maximum permitted level of noise of a pixel.

In an aspect of the present invention, the surrounding pixel is provided plurally, and the calculating of the first substitution value includes calculating first pixel values by respectively assigning the noise weight to the pixel values of the surrounding pixels, calculating a second pixel value by assigning a reverse weight, which is determined based on the noise weight, to the pixel value of the center pixel, and calculating the first substitution value based on calculation results respectively based on each first pixel value and the second pixel value, and the number of surrounding pixels.

According to another aspect of the present invention, an apparatus to enhance detail of an image includes a noise weight calculator to calculate a noise weight corresponding to a probability that a center pixel, located in a block of pixels in a region of the image, is noise by using a pixel value difference between the center pixel and a surrounding pixel located in the block of pixels, a first substitution value calculator to calculate a first substitution value for the center pixel based on the noise weight, and a second substitution value calculator to calculate a second substitution value for the center pixel by using the noise weight and a sharpen filter.

According to still another aspect of the present invention, a method of calculating a noise weight includes calculating a pixel value difference between two pixels, and calculating the noise weight based on the pixel value difference and a noise level which is a maximum permitted level of noise of a pixel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
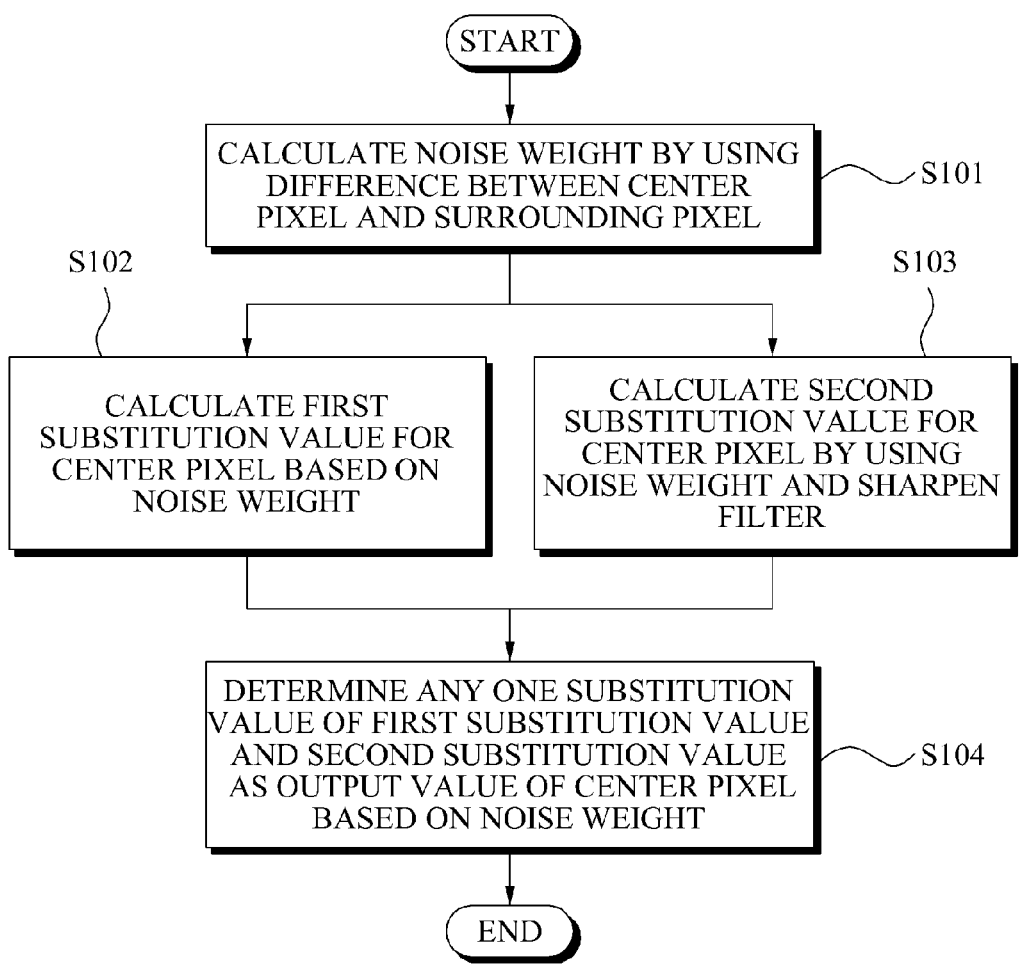
FIG. 1 is a flowchart illustrating a method of enhancing detail according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of enhancing detail according to an embodiment of the present invention. In operation S101, an apparatus to enhance detail based on noise elimination for an image calculates a noise weight by using a difference between a center pixel located in a block of pixels in a region of the image and a surrounding pixel located in the block of pixels. According to an aspect of the present invention, the surrounding pixel includes remaining pixels other than the center pixel from among pixels included in an n×n-sized block centering on the center pixel. In this instance, the apparatus to enhance the detail of the image respectively calculates a pixel value difference among each surrounding pixel and the center pixel of the block which is the center pixel in the image, and calculate the noise weight by using the pixel value difference. For example, when a size of the block is 3×3, eight noise weights are calculated corresponding to the respective noise weights between the center pixel and each of eight surrounding pixels. It is understood that the size of the block is not limited to being a 3×3 pixel block, and may instead be various other sizes and shapes.

A method according to aspects of the present invention by which the apparatus to enhance the detail of an image calculates the pixel value difference among each surrounding pixel and the center pixel, and calculates the noise weight based on the pixel value difference and a noise level, will now be described. The noise level denotes a permitted level of noise of a pixel. Also, the noise weight is a criterion denoting how high a probability is that a pixel is noise, i.e., a noise pixel, and is controlled to have a value between 0 and 1. Therefore, it is understood that the probability that the pixel is noise increases as the noise weight increases, and the probability that the pixel is noise decreases as the noise weight decreases. Specifically, in an extreme case where the noise weight is 0, the corresponding pixel is regarded as noise-free.

Figure 2:
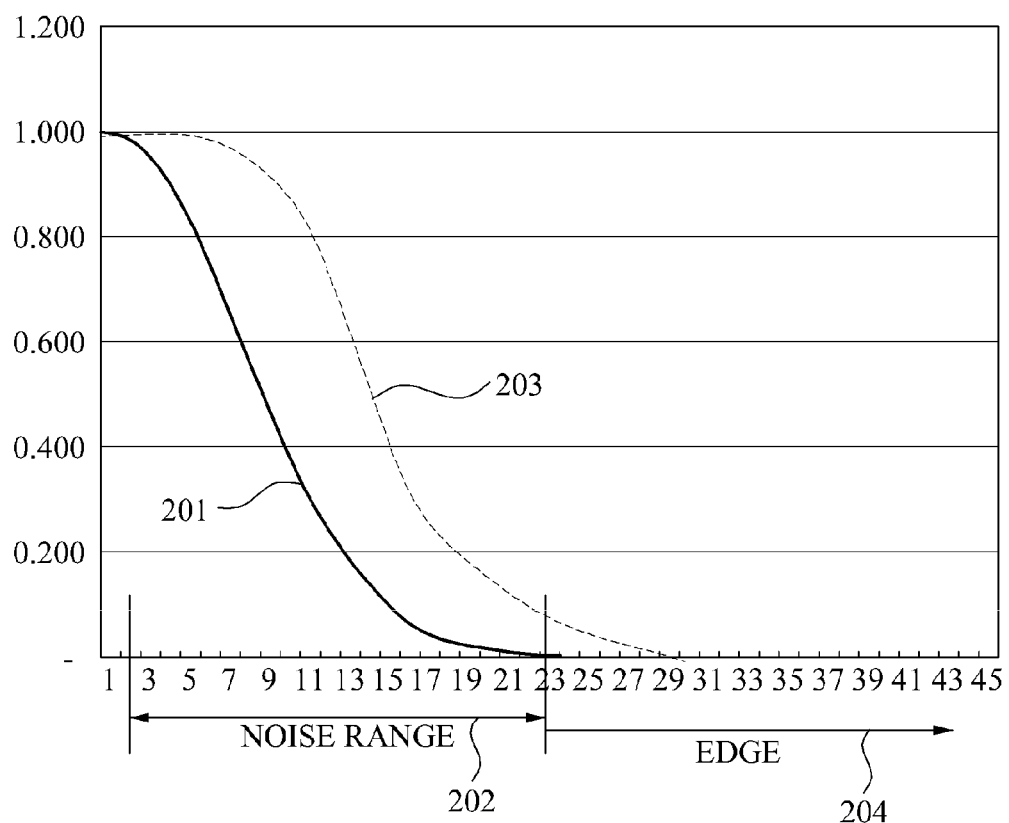
FIG. 2 illustrates an example of a relationship between a pixel value difference between pixels and a noise weight according to an embodiment of the present invention.

FIG. 2 illustrates an example of a relationship between a pixel value difference between pixels and a noise weight according to an embodiment of the present invention. In FIG. 2, a graph 200 illustrates the relationship between the pixel value difference and the noise weight by illustrating the pixel value difference between two pixels as odd numbers ranging from 1, 3, 5 . . . 41, 43, 45 shown on the x-axis, and the noise weight as 0.2 increment values ranging from 0.200, 0.400 . . . 1.000, 1.200 shown on the y-axis. In this instance, an x-axis section corresponding to a range of a first curve 201 is a noise range 202. Specifically, the noise weight for the pixel having the difference corresponding to the noise range 202 can be determined based on the difference calculated by using Equation 1:

$$\text{Weight} = \text{EXP}\left[\left(-0.5 \times \left(\frac{\text{Pixel\_Difference}}{\text{Noise\_Level}}\right)^2\right)\right], \quad \text{[Equation 1]}$$

where "Weight" denotes a noise weight, "EXP" denotes an exponential function, "Pixel_Difference" denotes a pixel value difference between two pixels, and "Noise_Level" denotes a permitted level of noise of a pixel. According to an aspect of the present invention, the two pixels respectively denote the center pixel and the surrounding pixel of an n×n-sized block.

Even though the method of calculating the noise weight by using the above-described Equation 1 is described in the present embodiment of the present invention, the method using Equation 1 is exemplary only and is provided for comprehensive understanding of an aspect of the present invention. However, other aspects of the present invention are not limited to the above-described embodiment using Equation 1, and it would be appreciated by those skilled in the art that many modifications and variations are possible in light of the above teaching. For example, a calculation of the exponential function to calculate the noise weight can be substituted with a Look-Up Table (LUT), and the noise weight can be calculated by using simplified Equation 2:

$$\text{Weight} = 1 - \left(0.5 \times \left(\frac{\text{Pixel\_Difference}}{\text{Noise\_Level}}\right)^2\right). \quad \text{[Equation 2]}$$

As described above with reference to Equation 1, "Noise_Level" is a variable denoting the permitted level of noise of the pixel, i.e., the maximum permitted level of noise of the pixel. As the noise level increases, a higher noise weight is generated, even if the variable "Pixel Difference" referring to a pixel value difference between the two pixels stays equal. Specifically, a second curve 203 in the graph 200 illustrates the relationship between the pixel value difference and the noise weight which is shown when the noise level is higher than the noise level of the first curve 201. The noise level can use a predefined constant, and be changed based on a brightness of the center pixel by using the variable noise level based on a brightness level. Specifically, a smoothing degree can be increased in order to eliminate noise by increasing the noise level in a low brightness level having a relatively large amount of noise.

In operation S102, the apparatus to enhance detail calculates a first substitution value for the center pixel based on the noise weight. In this instance, the apparatus to enhance the detail can calculate the first substitution value based on a calculation between the pixel value of the surrounding pixel and the pixel value of the center pixel. Here, the noise weight is respectively assigned to the pixel value of the surrounding pixel, and a reverse weight, which is determined based on the noise weight, is assigned to the pixel value of the center pixel. In this instance, a sum of the reverse weight and the noise weight equals 1.

According to an aspect of the present invention, the first substitution value is a value used to eliminate noise for a noise pixel. The apparatus to enhance the detail of the image can calculate the first substitution value, which is used to substitute the pixel value of the center pixel based on the noise weight, in order to eliminate noise when the center pixel is the noise pixel. Specifically, as described above, the apparatus to enhance the detail of an image can use a weighted average considering a pixel value difference among each surrounding pixel and the center pixel in order to calculate the first substitution value. For example, the first substitution value can be calculated using Equation 3 and Equation 4:

$$\text{Weighted } Y = (\text{Weight} \times Y_{neighbor}) + (1 - \text{Weight}) \times Y_{center}, \quad \text{[Equation 3]}$$

where "$Y_{neighbor}$" denotes a pixel value of a surrounding pixel, and $Y_{center}$ denotes a pixel value of a center pixel, in an n×n-sized block. According to the above-described Equation 3, as the probability of the surrounding pixel being a noise pixel increases as the noise weight "Weight" increases, "Weighted Y" is calculated by assigning the higher weight to the pixel value of the surrounding pixel. Conversely, as the noise weight decreases, that is, as the probability of the surrounding pixel not being a noise pixel increases, "Weighted Y" has a value approximately equal to an original pixel value of the center pixel.

As described above, a process of applying the above-described Equation 3 is respectively performed for all surrounding pixels which surround the center pixel in a predetermined block. An average of summing "Weighted Y" and dividing the sum by a number of surrounding pixels, that is, the first substitution value, is ultimately calculated in accordance with Equation 4:

$$Y_{smoothed} = \frac{\sum \text{Weighted } Y_i}{n}, \quad \text{[Equation 4]}$$

where "$Y_{smoothed}$" denotes the first substitution value, "Weighted $Y_i$" denotes an i-th value of "Weighted Y," and n denotes a number of surrounding pixels.

Since the noise weight of the surrounding pixel is approximately 1 when the center pixel has a large amount of noise, the first substitution value is greatly affected by the surrounding pixel, and the smoothing degree increases. Conversely, since the noise weights for each surrounding pixel are low when the center pixel is a normal pixel having little noise, the first substitution value has a value approximate to the original pixel value of the center pixel. Specifically, since the pixel included in the noise range 202 of the graph 200 has a high smoothing effect, noise is naturally eliminated, and the pixel included in an edge 204 maintains an original value.

In operation S103, the apparatus to enhance the detail calculates a second substitution value for the center pixel by using the noise weight and a sharpen filter. Here, the sharpen filter includes a sharpen mask including an n×n-sized block. According to an aspect of the present invention, a sum of values included in each block of the sharpen mask is 1. The apparatus to enhance the detail of the image applies the sharpen filter to a calculation result among the pixel value of the center pixel and each pixel value of the surrounding pixels, and calculates the second substitution value based on the calculation result to which the sharpen filter is applied. In this instance, the noise weight is assigned to the pixel value of the center pixel, and reverse weights, which are determined based on the noise weight, are respectively assigned to the pixel values of the surrounding pixel. Here, a sum of the reverse weight and the noise weight equals 1. Specifically, the reverse weight can be a remainder value equal to a difference of subtracting the noise weight from 1.

Figure 3:
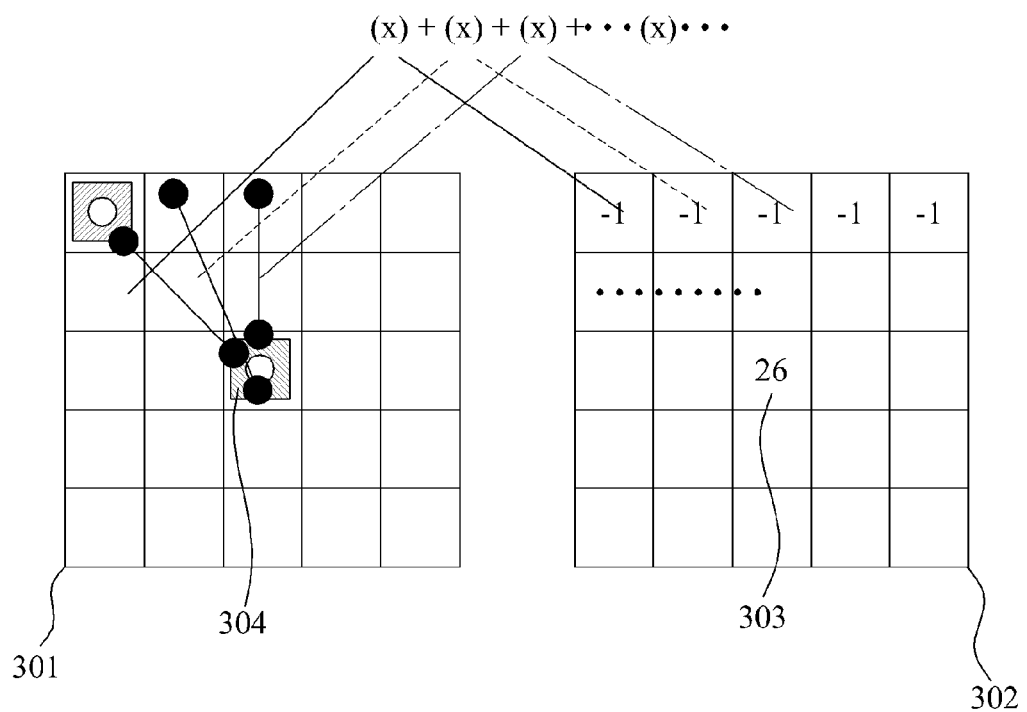
FIG. 3 illustrates a method of calculating a second substitution value in which a sharpening degree is controlled based on a noise weight according to an embodiment of the present invention.

FIG. 3 illustrates an example of a method of calculating a second substitution value in which a sharpening degree is controlled based on a noise weight according to an embodiment of the present invention. Specifically, FIG. 3 illustrates a method of calculating the second substitution value by applying a 5×5-sized sharpen mask 302 to a 5×5-sized pixel block 301. In this instance, a center pixel is weighted by the sharpened mask 302, similar to a block 303.

The second substitution value can be calculated by using Equation 5, Equation 6, and Equation 7:

$$\text{Weight } Y' = (1 - \text{Weight}) \times Y_{neighbor} + (\text{Weight} \times Y_{center}). \quad \text{[Equation 5]}$$

Here, it can be understood that the above-described Equation 5 assigns the noise weight to the pixel value of the center pixel instead of the surrounding pixel, compared with the above-described Equation 3. Specifically, since the pixel value of the center pixel maintains an original value as the probability of the center pixel being a noise pixel increases, sharpening greater than or equal to the original value is not generated.

$$\text{Filtered } Y = \text{Weighted } Y' \times \text{Mask}[n], \quad \text{[Equation 6]}$$

Here, for example, "Mask[n]" denotes an n×n-sized sharpen mask similar to the sharpen mask 302 used for the example of FIG. 3. The above-described Equation 6 denotes a process of performing a convolution of "Weight Y'" into the sharpen mask. Specifically, the above-described Equation 6 denotes a calculation of multiplying "Weight Y'" by a value of the sharpen mask corresponding to a location of the center pixel used for a calculation of "Weight Y'," similar to the example of FIG. 3.

Equation 7 is as follows:

$$Y_{sharpened} = \Sigma \text{Filtered } Y_i, \quad \text{[Equation 7]}$$

where "$Y_{sharpened}$" denotes the second substitution value, and "Filtered $Y'_i$" denotes a value corresponding to an i-th surrounding pixel of "Filtered $Y_i$'s". Specifically, the second substitution value can denote a sum of "Filtered $Y_i$'s."

According to the present embodiment of the present invention, sharpening is generated for only the noise-free pixel by classifying pixels as either a noise pixel or a noise-free pixel. Specifically, the pixels included in the noise range 202 of FIG. 2 maintain their original values, and the pixels included in the edge 204 are sharpened.

According to the present embodiment of the present invention, the calculating of the first substitution value in operation S102 and the calculating of the second substitution value in operation S103 are performed in parallel without requiring a particular sequence, i.e., without requiring performing one of the operations S102 or S103 before performing the other operation S102 or S103. Specifically, the first substitution value and the second substitution value for the center pixel are calculated in parallel without requiring a particular sequence. As described above, since operation S102 and operation S103 are respectively performed in parallel in order to calculate the first substitution value and the second substitution value for the center pixel, a delay which is generated when noise elimination and detail enhancement are sequentially performed is eliminated.

In operation S104, the apparatus to enhance the detail of the image determines one of the substitution value of the first substitution value or the second substitution value as an output value of the center pixel based on the noise weight. Specifically, the apparatus to enhance the detail of the image determines either the substitution value of the first substitution value or the second substitution value respectively calculated in operation S102 and operation S103 as an output value based on the noise weight, and substitutes the center pixel with the determined substitution value. Specifically, the apparatus to enhance the detail of the image eliminates noise and enhances the detail by performing operations S101 through S104 for each of the pixels of the image. Operation S104 is described in detail with reference to FIG. 4.

Figure 4:
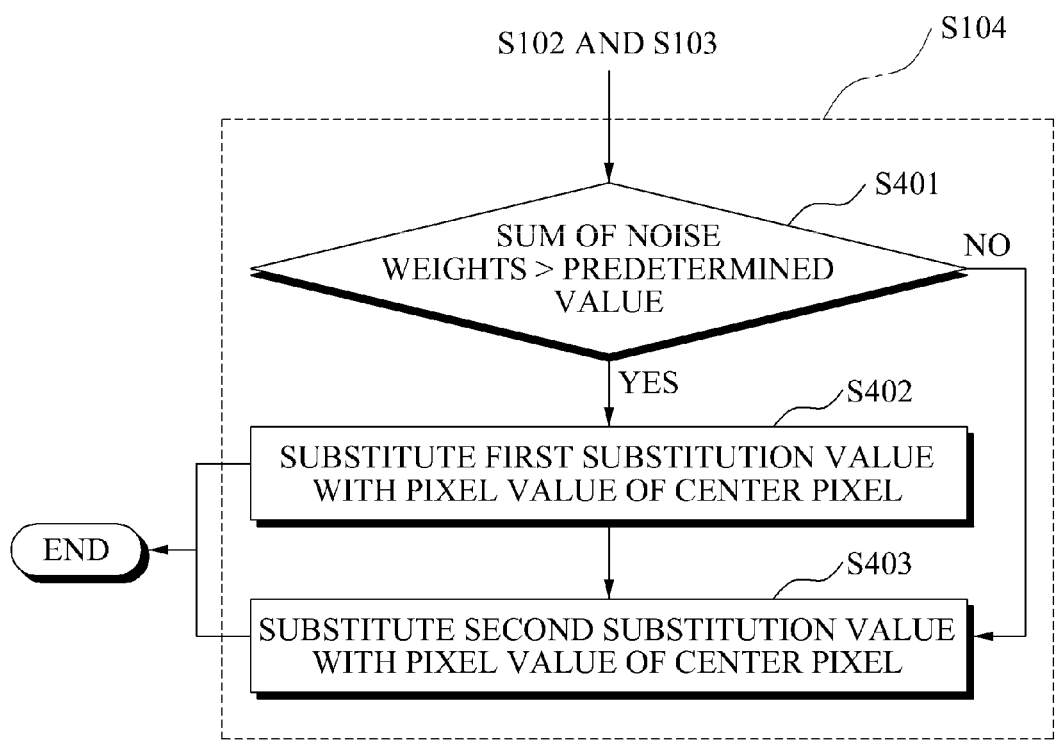
FIG. 4 is a flowchart illustrating a method to determine a substitution value of FIG. 2.

FIG. 4 is a flowchart illustrating an operation of a method of determining a substitution value of FIG. 2. Here, the apparatus to enhance the detail calculates a sum of noise weights calculated for the center pixel and each surrounding pixel, and selects one of either the first substitution value or the second substitution value by comparing the sum and a predetermined value.

In operation S401, the apparatus to enhance the detail of the image compares the sum of noise weights and the predetermined value. In this instance, when the sum of noise weights is greater than the value, the apparatus substitutes a pixel value of the center pixel with the first substitution value is performed in operation S402. When the sum of noise weights is less than or equal to the predetermined value, the apparatus substitutes the pixel value of the center pixel with the second substitution value in operation S403. Specifically, when operation S402 is performed, smoothing is generated in the center pixel, and when operation S403 is performed, sharpening is generated in the center pixel.

Theoretically, when the predetermined value is 0 and the sum of noise weights and 0 (the predetermined value) are compared, either one of the first substitution value or the second substitution value may be determined as the output value. However, the predetermined value is determined by experimentally increasing a permissible level of the predetermined value, or changing the predetermined value into a more appropriate value. Specifically, noise elimination and detail enhancement are performed in parallel, however, only one of two results is selected as the output value. Accordingly, since the noise elimination is performed in a noise area and the detail enhancement is performed in an area other than the noise area, the beneficial effects of the noise elimination and the detail enhancement are maximized.

Figure 5:
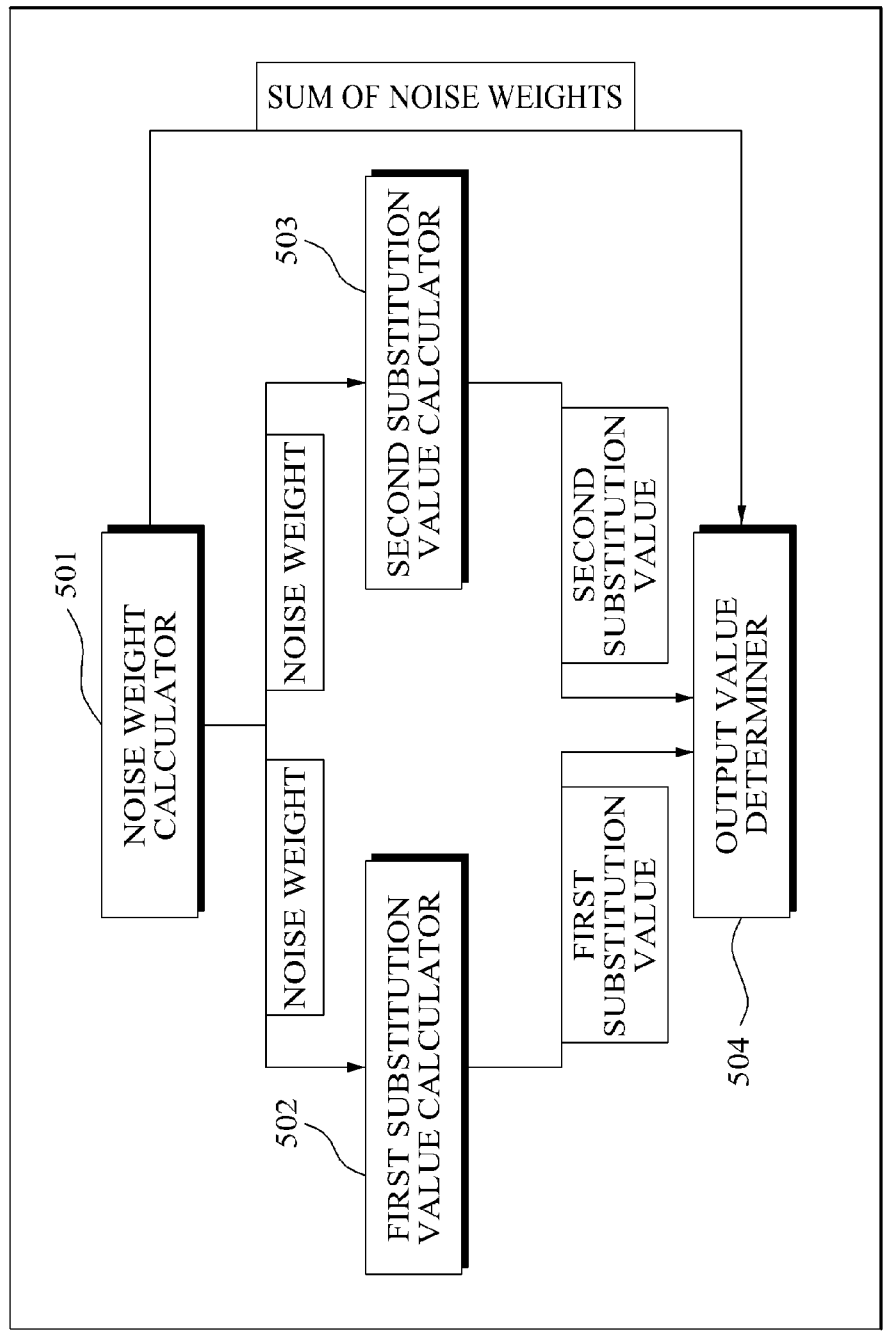
FIG. 5 is a block diagram illustrating an internal configuration of an apparatus to enhance detail according to an embodiment of the present invention.

FIG. 5 is a block diagram illustrating an internal configuration of an apparatus 500 to enhance detail of an image according to an embodiment of the present invention. Here, the apparatus 500 to enhance the detail includes a noise weight calculator 501, a first substitution value calculator 502, a second substitution value calculator 503, and an output value determiner 504.

The noise weight calculator 501 calculates a noise weight by using a difference between a center pixel and a surrounding pixel. Here, the surrounding pixel includes remaining pixels other than the center pixel from among pixels included in an n×n-sized block centering on the center pixel. In this instance, the noise weight calculator 501 respectively calculates a pixel value difference among each surrounding pixel and the center pixel of the block centering on the center pixel in the image, and calculates the noise weight by using the pixel value difference. For example, when a size of the block is 3×3, eight noise weights corresponding to the respective noise weights between the center pixel and each of eight surrounding pixels are calculated.

In the present embodiment of the present invention, the apparatus 500 which calculates the pixel value difference among each surrounding pixel and the center pixel, and calculates the noise weight based on the pixel value difference and a noise level, is described. Here, the noise level is a permitted level of noise of a pixel. Also, the noise weight is a criterion denoting how high a probability is that a pixel is a noise pixel, and is controlled to have a value between 0 and 1. In this instance, it is understood that the probability that the pixel is noise increases as the noise weight increases, and decreases as the noise weight decreases. Specifically, when the noise weight is 0 as an extreme case, the corresponding pixel is regarded as noise-free.

The first substitution value calculator 502 calculates a first substitution value for the center pixel based on the noise weight. In this instance, the first substitution value calculator 502 calculates the first substitution value based on a calculation between the pixel value of the surrounding pixel and the pixel value of the center pixel. Here, the noise weight is respectively assigned to the pixel value of the surrounding pixel, and a reverse weight, which is determined by the noise weight, is assigned to the pixel value of the center pixel. In this instance, a sum of the reverse weight and the noise weight equals 1.

The first substitution value is a value used to eliminate noise for a noise pixel, and the first substitution value calculator 502 calculates the first substitution value for substituting the pixel value of the center pixel based on the noise weight, in order to eliminate noise when the center pixel is the noise pixel. Specifically, as described above, the first substitution value calculator 502 uses a weighted average considering a pixel value difference among each surrounding pixel and the center pixel in order to calculate the first substitution value.

For example, the first substitution value is calculated by using the above-described Equation 3 and the above-described Equation 4. According to the above-described Equation 3, as the probability of the surrounding pixel being a noise pixel increases based on the noise weight "Weight,", "Weighted Y'" is calculated by assigning the higher weight to the pixel value of the surrounding pixel. Conversely, as the noise weight decreases, that is, as the probability of the surround pixel not being a noise pixel increases, "Weighted Y" has a value approximate to an original pixel value of the center pixel.

As described above, the first substitution value calculator 502 respectively performs a process of applying the above-described Equation 3 for all surrounding pixels which surround the center pixel in a predetermined block, and calculates an average by summing and dividing the sum by a number of surrounding pixels, that is, the first substitution value, in accordance with the above-described Equation 4.

Since the noise weight of the surrounding pixel is approximately equal to 1 when the center pixel is noise, the first substitution value is greatly affected by the surrounding pixel, and the smoothing degree increases. Conversely, since the noise weights for each surrounding pixel are low when the center pixel is a normal pixel having no noise, the first substitution value has a value approximately equal to the original pixel value of the center pixel. Specifically, since the pixel included in the noise range 202 of the graph 200 illustrated in FIG. 2 has a high smoothing effect, noise is naturally eliminated, whereas the pixel included in the edge 204 maintains an original value.

The second substitution value calculator 503 calculates a second substitution value for the center pixel by using the noise weight and a sharpen filter. According to an aspect of the present invention, the sharpen filter includes a sharpen mask including an n×n-sized block, and a sum of values included in each unit of the block of the sharpen mask is 1. In this instance, the second substitution value calculator 503 applies the sharpen filter to calculation results among the pixel value of the center pixel and each pixel value of the surrounding pixel, and calculates the second substitution value based on the calculation result to which the sharpen filter is applied. In this instance, the noise weight is assigned to the pixel value of the center pixel, and a reverse weight, which is determined by the noise weight, is respectively assigned to the pixel value of the surrounding pixel. Here, a sum of the reverse weight and the noise weight equals 1.

For example, when the method of calculating the second substitution value by applying the 5×5-sized sharpen mask 302 to the 5×5-sized pixel block 301 is used, the center pixel 304 is weighted by the sharpen mask 302, similar to the block 303, and the second substitution value calculator 503 calculates the second substitution value by using the above-described Equation 5, the above-described Equation 6, and the above-described Equation 7.

It is understood that the above-described Equation 5 assigns the noise weight to the pixel value of the center pixel, whereas the above-described Equation 3 assigns the noise weight to the pixel value of the surrounding pixel. Specifically, since the pixel value of the center pixel maintains an original value as the probability of the center pixel being noise increases, sharpening greater than or equal to the original value of the center pixel is not generated.

According to the present embodiment of the present invention, sharpening is generated for only the noise-free pixel by classifying pixels as either a noise pixel or a noise-free pixel. Specifically, the pixel included in the noise range 202 of FIG. 2 maintains the original value, and the pixel included in the edge 204 is sharpened.

Here, the first substitution value calculator 502 and the second substitution value calculator 503 respectively calculate the first substitution value and the second substitution value for the center pixel in parallel. Specifically, noise elimination and detail enhancement are performed in parallel. Accordingly, a delay which is generated when the noise elimination and the detail enhancement are sequentially performed is eliminated.

The output value determiner 504 determines one of the substitution values selected from the first substitution value and the second substitution value as an output value of the center pixel based on the noise weight. Specifically, the output value determiner 504 determines either the first substitution value or the second substitution value respectively calculated by the first substitution value calculator 502 and the second substitution value calculator 503 as the output value, and substitutes the center pixel with the determined substitution value. The output value determiner 504 calculates a sum of noise weights calculated for the center pixel and each surrounding pixel, and selects one of the first substitution value or the second substitution value by comparing the sum and a predetermined value.

For example, the output value determiner 504 compares the sum of noise weights and the predetermined value. When the sum of noise weights is greater than the predetermined value, the output value determiner 504 substitutes a pixel value of the center pixel with the first substitution value, and when the sum of noise weights is less than or equal to the predetermined value, the output value determiner 504 substitutes the pixel value of the center pixel with the second substitution value. When the sum of noise weights is greater than the predetermined value, smoothing is generated in the center pixel, and when the sum of noise weights is less than or equal to the predetermined value, sharpening is generated in the center pixel.

In this instance, theoretically, when the predetermined value is 0 and the sum of noise weights and 0 are compared, the substitution values of both the first substitution value and the second substitution value are determined as the output value. However, the predetermined value can be determined by experimentally increasing a permissible level of the predetermined value, or changing the predetermined value into a more appropriate value. Specifically, noise elimination and detail enhancement are performed in parallel, however, only one of two results is selected as the output value. Accordingly, since the noise elimination is performed in a noise area, and the detail enhancement is performed in an area other than the noise area, the effects of the noise elimination and the detail enhancement are maximized.

Figure 6:
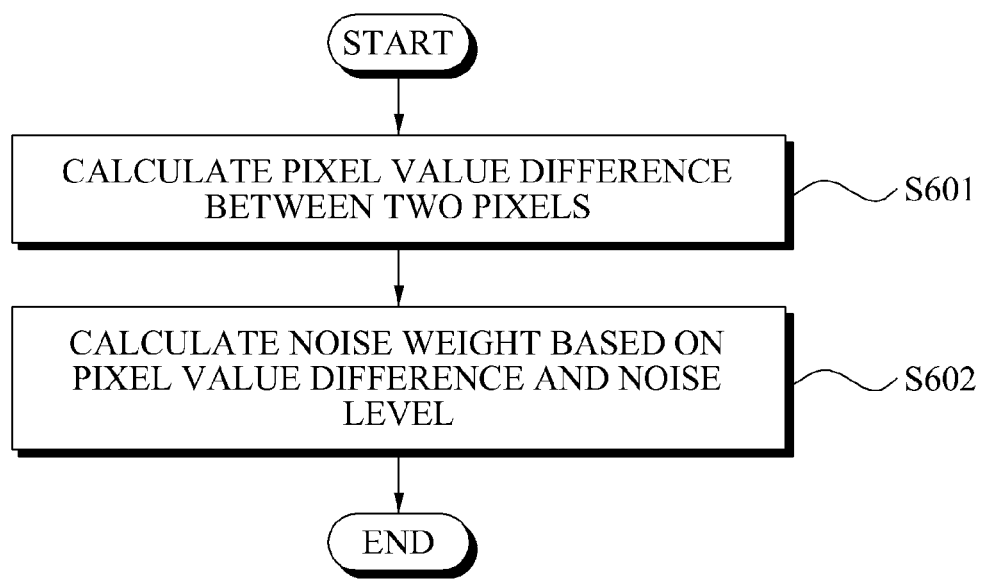
FIG. 6 is a flowchart illustrating a method of calculating a noise weight according to an embodiment of the present invention.

FIG. 6 is a flowchart illustrating a method of calculating a noise weight according to an embodiment of the present invention. In operation S601, an apparatus to calculate a noise weight calculates a pixel value difference between two pixels. Here, the noise weight is a criterion denoting how high a probability is that a pixel is noise, and is determined to have a value between 0 and 1. Also, it is understood that the probability that the pixel is the noise increases as the noise weight increases. For example, the pixel in which the noise weight is 0 is regarded as noise-free. In this instance, the apparatus to calculate the noise weight calculates the pixel value difference by subtracting a pixel value of another pixel from the pixel value of the pixel to calculate the noise weight.

In operation S602, the apparatus to calculate the noise weight calculates the noise weight based on the pixel value difference and a noise level. In this instance, the apparatus to calculate the noise weight calculates the noise weight by using a ratio of the pixel value difference to the noise level and a predetermined weight. For example, the noise weight can be calculated by using Equation 8:

$$\text{Weight} = \text{EXP}\left[\left(-0.5 \times \left(\frac{\text{Pixel\_Difference}}{\text{Noise\_Level}}\right)^2\right)\right], \quad \text{[Equation 8]}$$

where "Weight" denotes a noise weight, "EXP" denotes an exponential function, "Pixel_Difference" denotes a pixel value difference between two pixels, and "Noise_Level" denotes a noise level being a permitted level of noise of a pixel. Specifically, in the above-described example, the predetermined weight '−0.5' is assigned to a square value of the ratio of the pixel value difference to the noise level, and the noise weight is calculated using the exponential function.

Here, as described above, "Noise_Level" is a variable denoting the permitted level of noise of the pixel. As the noise level increases, the noise weight increases, even when the pixel values of the two pixels stay equal. Specifically, the second curve 203 in the graph 200 of FIG. 2 illustrates the relationship between the difference and the noise weight which can be shown when the noise level is higher than the noise level of the first curve 201. According to an aspect of the present invention, the noise level uses a predefined constant, and is changed based on a brightness of the center pixel by using the variable noise level based on a brightness level. Specifically, a smoothing degree is increased in order to eliminate noise by increasing the noise level in a low brightness level having a relatively large amount of noise.

Figure 7:
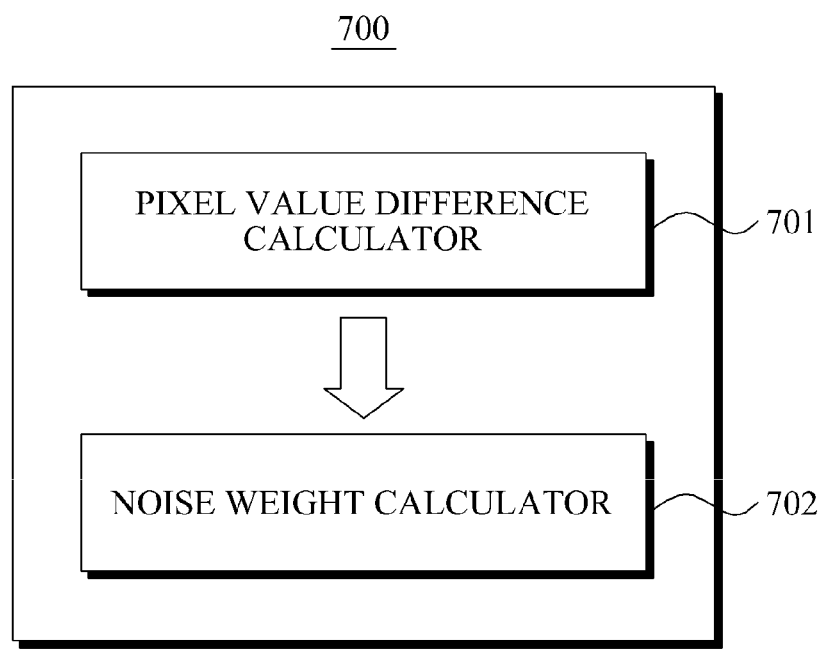
FIG. 7 is a block diagram illustrating an internal configuration of an apparatus to calculate a noise weight according to an embodiment of the present invention.

FIG. 7 is a block diagram illustrating an internal configuration of an apparatus 700 to calculate a noise weight according to an embodiment of the present invention. Here, the apparatus 700 to calculate the noise weight includes a pixel value difference calculator 701 and a noise weight calculator 702, as illustrated in FIG. 7.

The pixel value difference calculator 701 calculates a pixel value difference between two pixels. The noise weight is a criterion denoting how high a probability is that a pixel is noise, and is determined to be a value between 0 and 1. Also, it is understood that the probability that the pixel is noise increases as the noise weight increases. For example, the pixel in which the noise weight is 0 is regarded as noise-free. In this instance, the pixel value difference calculator 701 calculates the pixel value difference by subtracting a pixel value of another pixel from the pixel value of the pixel to calculate the noise weight.

The noise weight calculator 702 calculates the noise weight based on the pixel value difference and a noise level. In this instance, the noise weight calculator 702 calculates the noise weight by using a ratio of the pixel value difference to the noise level and a predetermined weight. For example, the noise weight is calculated by using the above-described Equation 8.

As described above, "Noise_Level" is a variable denoting the permitted level of noise of the pixel. As the noise level increases, the noise weight increases, even if the pixel difference between the two pixels stays equal. Specifically, the second curve 203 in the graph 200 of FIG. 2 illustrates the relationship between the pixel value difference and the noise weight when the noise level is higher than the noise level of the first curve 201. According to an aspect of the present invention, the noise level uses a predefined constant, and is changed based on a brightness of the center pixel by using the variable noise level. Specifically, a smoothing degree is increased in order to eliminate noise by increasing the noise level in a low brightness level having a relatively large amount of noise.

Even though the method of calculating the noise weight by using the above-described Equation 8 is described with reference to FIG. 6 and FIG. 7, it is understood that the description of the method of calculating the noise weight using Equation 8 is exemplary only, and is provided for a comprehensive understanding of an aspect of the present invention. However, other aspects of the present invention are not limited to the above-described embodiment which uses Equation 8, and it would be appreciated by those skilled in the art that many modifications and variations are possible in light of the above teaching. For example, a calculation of the exponential function used to calculate the noise weight can be substituted with an LUT, and the noise weight can be calculated by using Equation 9:

$$\text{Weight} = 1 - \left(0.5 \times \left(\frac{\text{Pixel\_Difference}}{\text{Noise\_Level}}\right)^2\right). \quad \text{[Equation 9]}$$

As described above, the noise weight calculated by the method of calculating the noise weight or the apparatus to calculate the noise weight according to aspects of the present invention can be used for noise elimination and detail enhancement by using the above-described method of enhancing the detail of an image or the above-described apparatus to enhance the detail of an image.

The above-described embodiments according to aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of implementing aspects of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described aspects of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method of enhancing detail of an image, the method comprising:
   calculating, using a processor, a noise weight corresponding to a probability that a center pixel, located in a block of pixels in a region of the image, is noise by using a pixel value difference between the center pixel and a surrounding pixel located in the block of pixels;
   calculating a first substitution value for the center pixel based on the noise weight; and
   calculating a second substitution value for the center pixel by using the noise weight and a sharpen filter, and classifying pixels as either a noise pixel or a noise-free pixel,
   wherein the sharpen filter is applied to a pixel classified as a noise-free pixel, and a pixel classified as a noise pixel maintains an original value, and
   wherein the noise-free pixel and the noise pixel are classified according to a sum of noise weights calculated for the center pixel and each surrounding pixel.

2. The method of claim 1, wherein the first substitution value and the second substitution value for the center pixel are calculated in parallel.

3. The method of claim 1, wherein the surrounding pixel comprises a remaining pixel other than the center pixel selected from among pixels included in the block of pixels comprising an n×n-sized block of pixels centered on the center pixel.

4. The method of claim 1, wherein the calculating of the noise weight comprises:
   calculating the pixel value difference among the surrounding pixel and the center pixel; and
   calculating the noise weight based on the pixel value difference and a noise level,
   wherein the noise level is a maximum permitted level of noise of a pixel.

5. The method of claim 1, wherein the surrounding pixel is provided plurally, and wherein the calculating of the first substitution value comprises calculates the first substitution value based on the noise weight, a pixel value of the center pixel, pixel values of the surrounding pixels, and a number of the surrounding pixels.

6. The method of claim 5, wherein the calculating of the first substitution value further comprises:

calculating first pixel values by respectively assigning the noise weight to the pixel values of the surrounding pixels;

calculating a second pixel value by assigning a reverse weight, which is determined based on the noise weight, to the pixel value of the center pixel; and calculating the first substitution value based on calculation results respectively based on each first pixel value and the second pixel value, and the number of surrounding pixels.

7. The method of claim 1, wherein the sharpen filter includes a sharpen mask including an n×n-sized block, and a sum of values included in each unit of the n×n-sized block is 1.

8. The method of claim 1, wherein the calculating of the second substitution value comprises calculating the second substitution value based on the noise weight, a pixel value of the center pixel, a pixel value of the surrounding pixel, and the sharpen filter.

9. The method of claim 8, wherein the calculating of the second substitution value further comprises:

calculating a first pixel value by assigning the noise weight to the pixel value of the center pixel;

calculating a second pixel value by respectively assigning a reverse weight, which is determined based on the noise weight, to the pixel value of the surrounding pixel;

applying the sharpen filter to a calculation result among the first pixel value and the second pixel value; and calculating the second substitution value based on the calculation result to which the sharpen filter is applied.

10. The method of claim 1, further comprising:

determining either the first substitution value or the second substitution value as an output value of the center pixel based on the noise weight.

11. The method of claim 10, wherein the surrounding pixel is provided plurally, and the determining comprises:

determining the output value by comparing a sum of noise weights calculated for each surrounding pixel and a predetermined value.

12. The method of claim 11, wherein the determining of the output value comprises determining the second substitution value as the output value when the sum is greater than the predetermined value, and determining the first substitution value as the output value when the sum is less than or equal to the predetermined value.

13. The method of claim 1, wherein calculating the second substitution value is based on a filter combining noise weight and sharpening, in which a sharpening degree is controlled based on the noise weight.

14. A method of calculating a noise weight, the method comprising:

calculating a pixel value difference between two pixels;

calculating, using a processor, the noise weight based on the pixel value difference and a noise level which is a maximum permitted level of noise of a pixel;

calculating a reverse weight, wherein the sum of the reverse weight and the noise weight equals 1; and classifying pixels as either a noise pixel or a noise-free pixel, wherein a pixel classified as a noise-free pixel is sharpened, and a pixel classified as a noise pixel maintains an original value, and wherein the noise-free pixel and the noise pixel are classified according to a sum of noise weights calculated for the center pixel and each surrounding pixel.

15. The method of claim 14, wherein the calculating of the noise weight comprises:

calculating the noise weight by using a ratio of the pixel value difference to the noise level and multiplying the ratio by a predetermined weight.

16. The method of claim 14, wherein the calculating of the noise weight comprises calculating the noise weight by using the equation:

$$\text{Weight} = \text{EXP}\left[\left(-0.5 \times \left(\frac{\text{Pixel\_Difference}}{\text{Noise\_Level}}\right)^2\right)\right],$$

where "Weight" denotes the noise weight, EXP denotes an exponential function, Pixel_Difference denotes the pixel value difference, and Noise_Level denotes the noise level.

17. The method of claim 14, wherein the calculating of the noise weight comprises calculating the noise weight based on a ratio of the pixel value difference to the noise level, the ratio multiplied by a predetermined weight, and a Look-Up Table (LUT) corresponding to an exponential calculation.

18. A non-transitory computer-readable recording medium storing a program to implement a method of enhancing detail of an image, the method comprising:

calculating a noise weight corresponding to a probability that a center pixel, located in a block of pixels in a region of the image, is noise by using a pixel value difference between the center pixel and a surrounding pixel located in the block of pixels;

calculating a first substitution value for the center pixel based on the noise weight; and calculating a second substitution value for the center pixel by using the noise weight and a sharpen filter, and classifying pixels as either a noise pixel or a noise-free pixel, wherein the sharpen filter is applied to a pixel classified as a noise-free pixel, and a pixel classified as a noise pixel maintains an original value, and wherein the noise-free pixel and the noise pixel are classified according to a sum of noise weights calculated for the center pixel and each surrounding pixel.

19. An apparatus to enhance detail of an image, the apparatus comprising:

a noise weight calculator to calculate, using a processor, a noise weight corresponding to a probability that a center pixel, located in a block of pixels in a region of the image, is noise by using a pixel value difference between the center pixel and a surrounding pixel located in the block of pixels;

a first substitution value calculator to calculate a first substitution value for the center pixel based on the noise weight; and a second substitution value calculator to calculate a second substitution value for the center pixel by using the noise weight and a sharpen filter, and classify pixels as either a noise pixel or a noise-free pixel, wherein the sharpen filter is applied to a pixel classified as a noise-free pixel, and a pixel classified as a noise pixel maintains an original value, and wherein the noise-free pixel and the noise pixel are classified according to a sum of noise weights calculated for the center pixel and each surrounding pixel.

20. The apparatus of claim 19, wherein the first substitution value and the second substitution value for the center pixel are calculated in parallel.

21. The apparatus of claim 19, wherein the surrounding pixel is provided plurally, and the noise weight calculator calculates the pixel value difference among each surrounding pixel and the center pixel, and calculates the noise weight of each surrounding pixel based on the respective pixel value difference and a noise level, and the noise level is a maximum permitted level of noise of a pixel.

22. The apparatus of claim 19, further comprising:

an output value determiner to determine either the first substitution value or the second substitution value as an output value of the center pixel based on the noise weight.

23. An apparatus to calculate a noise weight, the apparatus comprising:

a pixel value difference calculator to calculate a pixel value difference between two pixels; and a noise weight calculator to calculate, using a processor, the noise weight, which corresponds to a probability that one of the two pixels is noise, based on the pixel value difference and a noise level which is a maximum permitted level of noise of a pixel; and a reverse weight, wherein the sum of the reverse weight and the noise weight equals 1, and classify pixels as either a noise pixel or a noise-free pixel, wherein a pixel classified as a noise-free pixel is sharpened, and a pixel classified as a noise pixel maintains an original value, and wherein the noise-free pixel and the noise pixel are classified according to a sum of noise weights calculated for the center pixel and each surrounding pixel.

24. The apparatus of claim 23, wherein the noise weight calculator calculates the noise weight by multiplying a ratio of the pixel value difference to the noise level by a predetermined weight.

25. The apparatus of claim 23, wherein the noise weight calculator calculates the noise weight by using the equation:

$$\text{Weight} = \text{EXP}\left[\left(-0.5 \times \left(\frac{\text{Pixel\_Difference}}{\text{Noise\_Level}}\right)^2\right)\right],$$

where Weight denotes the noise weight, EXP denotes an exponential function, Pixel_Difference denotes the pixel value difference, and Noise_Level denotes the noise level.

26. The apparatus of claim 23, wherein the noise weight calculator calculates the noise weight based on a ratio of the pixel value difference to the noise level, the ratio multiplied by a predetermined weight, and a Look Up Table (LUT) corresponding to an exponential calculation.

* * * * *